(12) United States Patent
Doedens

(10) Patent No.: US 12,487,189 B2
(45) Date of Patent: Dec. 2, 2025

(54) LASER SCANNING OF CABLE AND CABLE ACCESSORY COMPONENTS SUBJECTED TO MECHANICAL LOADS AND ELASTIC OR INELASTIC DEFORMATION

(71) Applicant: NEXANS, Courbevoie (FR)

(72) Inventor: Espen Doedens, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 18/589,193

(22) Filed: Feb. 27, 2024

(65) Prior Publication Data

US 2025/0208062 A1 Jun. 26, 2025

(30) Foreign Application Priority Data

Feb. 28, 2023 (EP) .................................... 23305264

(51) Int. Cl.
| | |
|---|---|
| *G01N 21/952* | (2006.01) |
| *G01B 11/16* | (2006.01) |
| *G01N 21/88* | (2006.01) |

(52) U.S. Cl.
CPC ........... *G01N 21/952* (2013.01); *G01B 11/16* (2013.01); *G01N 21/8851* (2013.01); *G01N 2021/887* (2013.01)

(58) Field of Classification Search
CPC ............. G01N 21/952; G01N 21/8851; G01N 2021/887; G01B 11/16
See application file for complete search history.

(56) References Cited

U.S. PATENT DOCUMENTS

2018/0180658 A1 6/2018 Godfrey

FOREIGN PATENT DOCUMENTS

| CN | 110 132 156 | | 8/2019 | |
|---|---|---|---|---|
| CN | 211 553 330 | | 9/2020 | |
| EP | 3 901 571 | | 10/2021 | |
| EP | 3901571 | A1 * | 10/2021 | ........... G01N 21/952 |
| EP | 4 030 175 | | 7/2022 | |

OTHER PUBLICATIONS

International Search Report dated Apr. 6, 2022.

* cited by examiner

*Primary Examiner* — Jamil Ahmed
(74) *Attorney, Agent, or Firm* — CANTOR COLBURN LLP

(57) ABSTRACT

A method for detecting deformations of high voltage and/or medium voltage cables and/or cable components, include at a first point of time, capturing and storing (302) a first set of 3-dimensional, 3D, surface geometry measurement data of an area of interest of a surface of the cable or cable component. The method also incudes, at a second point of time, capturing and storing (304) a second set of 3-dimensional, 3D, surface geometry measurement data of an area of interest of a surface of the cable or cable component by moving a 3D surface scanner about the cable over the area of interest. The first and second sets of captured 3D surface geometry measurement data is compared to determine changes that have occurred in the cables or cable components between the first and second points of time, where changes indicate a deformation of the cable or cable component.

8 Claims, 3 Drawing Sheets

LASER SCANNING OF CABLE AND CABLE ACCESSORY COMPONENTS SUBJECTED TO MECHANICAL LOADS AND ELASTIC OR INELASTIC DEFORMATION

RELATED APPLICATION

This application claims the benefit of priority from European Patent Application No. 23 305 264.6, filed on Feb. 28, 2023, the entirety of which is incorporated by reference.

FIELD OF THE INVENTION

The present invention relates to high voltage and medium voltage cables, in particular to a method for inspecting surfaces and/or interfaces of high voltage and/or medium voltage cable components.

BACKGROUND

A high voltage (HV) and medium voltage (MV) cable is used for electric power transmission at medium and high voltage, e.g. above 1 000 V. Such cables include a conductor and an insulation. The insulation may consist of polymers or polyethylene, including ethylene propylene rubber (EPR) and cross-linked polyethylene (XLPE). At inner and outer sides of the insulation semiconducting layers are fused to the insulation. The semiconducting layers prevent air-filled cavities between the metal conductors and the dielectric so that small electric discharges cannot arise and endanger the insulation material. The insulation is usually also covered by a copper or aluminum wire screen, or a lead or aluminium or copper jacket, or combinations thereof. This metallic screen or jacket is followed by a polymeric (e.g. PE or PVC) outer sheath.

MV and HV cables and cable components, for land applications and especially for submarine cable applications, can be subjected to high mechanical loads. Metallic or composite parts can be tailor-designed to meet the mechanical load requirements, but, when load is applied, parts, or part assemblies can commonly experience permanent deformation—For example may a single part experience deformation beyond elastic elongation limit, and in case of part assemblies, the parts can shift in relation to each other or their mating surface can be prone to permanent deformation. To map such deformation in 3D can be challenging.

Earlier, tracking such deformations, have been done by means of cameras, film, and photo, with manual measurements, or with other contact measurements. However, such measurements do not provide the desired versatility.

EP3901571 discloses a system and a method for determining a quality of a surface of a high voltage cable end using a 3D scanner. The method comprises moving a non-contact surface scanner about the cable end, measuring distance to the surface over the area of the surface by sequentially measuring a plurality of sub-areas of the area of the surface, creating a continuous 3D surface geometry measurement of the surface of the cable end and comparing, using the continuous 3D surface geometry measurement with at least one surface geometry acceptance threshold determining the quality of the surface of the high voltage cable end.

OBJECTS AND SUMMARY

The object of the invention is to provide a method for detecting and tracking/monitoring deformations in MV and HV cables and cable components, such as parts or part assemblies in cables and cable components.

The object of the invention is achieved by means of the features presented in the patent claims.

In the exemplary embodiments, various features and details are shown in combination. The fact that several features are described with reference to a particular example should not be construed as implying that those features have to be included together in all the embodiments of the invention.

Conversely, features that are described with reference to different embodiments should not be construed as mutually exclusive. As those skilled in the art will readily understand, embodiments that incorporate any subset of features described herein and that are not expressly interdependent have been contemplated by the inventor and are part of the intended disclosure. However, explicit descriptions of all such embodiments would not contribute to the understanding of the principles of the invention, and consequently some permutations have been omitted for the sake of simplicity.

Examples of parts or part assemblies in cables or cable components that can be subject to high mechanical loads and thus risk temporary or permanent deformations are:

- Cable armor (metallic or composite), which may experience shift in position, such as pitch, angular, radial and longitudinal elongation.
- Weldments of cable armor, in between isolated armor wires or between armor and flanges, rings, etc. can be subject to elongation of the assembly, or individual strands, etc.
- Armor or conductor locks where the armor wires are clamped onto a surface with high texture, or where armor or conductor wires are molded into cones which can be clamped onto.
- Accessory parts, such as tubes, flanges, bolts, etc.
- Pulling heads, with clamps, rings, etc.
- Pulling flanges
- Conductor connections, between conductor and ferrules which can be made via compression techniques, or bolted connections.
- Conductor or armor welds.
- Components or full assemblies subjected to an earthquake test.
- Full joint assemblies subjected to tensile or tensile bending tests.
- The curvatures of the cable or cable accessory can change along the cable or accessory geometry during various bending tests or compressions tests.
- Cable or accessory diameter can change during tensile tests.
- Cracks can occur in cable's water barrier (Lead, NiCu, etc.).
- Conductor damage can occur during various fatigue tests (before during and after tests).

A method for detecting deformations of high voltage and/or medium voltage cables and/or cable components, comprises in one embodiment the following steps:

a) at a first point of time, capture and store a first set of 3-dimensional, (3D), surface geometry measurement data of an area of interest of a surface of the cable or cable component, b) at a second point of time, capture and store a second set of 3-dimensional, (3D), surface geometry measurement data of said area of interest of a surface of the cable or cable component by moving a 3D surface scanner about the cable over said area of interest, and then c) compare the first and second sets of captured 3D surface geometry measurement data to determine changes that have occurred in the cables or cable components between the first and second points of time.

The area of interest can be the surface or part of surface of the high voltage cable, medium voltage cable and/or cable part as exemplified above.

The first set of 3D surface geometry measurement data can be captured by moving a 3D surface scanner about the cable over the area of interest. The 3D surface scanner can be any scanner or imaging device suitable for capturing images of 3D surfaces which can be used to provide a 3D representation of the surface. The 3D surface scanner can for example be a laser scanner, a structured light scanner, a lidar based scanner, photogrammetry means that captures a number of images which can be merged into a 3D model, etc.

In some embodiment, the first set of 3D surface geometry measurement data can be captured by inspecting a data file representing the geometry of the cable or cable component in the area of interest.

In order to use the method to monitor the high voltage and/or medium voltage cables and/or cable components over an extended period of time, the above step b) can be repeated over the desired period of time such that at a nth point of time, a nth set of 3-dimensional, (3D), surface geometry measurement data of said area of interest of a surface of the cable or cable component is captured and stored by moving the 3D surface scanner about the cable over said area of interest, and compare the n set of captured 3D surface geometry measurement data to determine changes that have occurred in the cables or cable components between the first, second and nth point of time.

The 3D surface geometry measurement data can be represented by a data point cloud, where data points in the data point cloud can be further processed to provide a representation of the cable or cable component.

The method according to any of the previous claims can further comprise generating a quality report for the area of interest.

The quality report can comprise a representation of a development of changes that have occurred from the first to the nth point of time by representing the changes linked to the corresponding points of time.

The quality report can identify the changes in the area of interest and may comprise an alarm or notification if the changes are larger than a threshold or other criterion. The criterions can be selected depending on the type of cable part to be scanned, the type of non-contact scanner used and the purpose of the scan. Examples of criterions are: a height variation threshold, a surface derivative threshold, a peeling wave threshold and/or at least one of an area of a cut, a depth of a cut, and a slope of a cut.

In one embodiment, the quality report can comprise a go/no go of the cable/cable part/cable component at the second or later point of time. The go/no go notification represents an evaluation of whether the cable or cable component should be allowed or disallowed to proceed operation at the second or $n^{th}$ point of time.

In this way an operator may receive a go or a no go after the scan is performed, allowing or disallowing the operator to proceed with the cable part or marking the cable for repair or replacement.

During scanning of smooth surfaces, 3D markers and/or talc spray is often used on the surface during the scanning process, respectively to provide accurate positioning and to minimize glaring. The 3D markers are used for the scanner to keep track of its angle and position in relation to the object to be measured, and they are particular important when the object to be scanned is geometrically featureless, such as a High Voltage (HV) cable, cable joint or cable end. When scanning HV cables, these 3D markers shield measurement data located underneath these 3D markers, which can lead to an incomplete surface inspection which can cause missing defects/deviations underneath the markers. Moreover, for the scanning of HV cable ends, 3D marker (stickers) may leave glue residue on the surface, which can lead to poor electrical performance of the apparatus afterwards.

This is not ideal and there is thus a need for strategies to avoid this.

Examples of such strategies are:

Use of a scanner with blue laser technology not requiring talc spray.

Using sticky or magnetic 3D markers which positions on the surface are shifted halfway during the process so the data underneath these markers can be included in the inspection.

Using a 3D scanner that uses an external camera and 3D markers on the scanner itself to obtain the scanner position in relation to the test object without 3D markers on the surface.

Using specialized 3D marker JIGs that mount the markers, positioned close to the surface but not on it.

DETAILED DESCRIPTION

Figure 1:
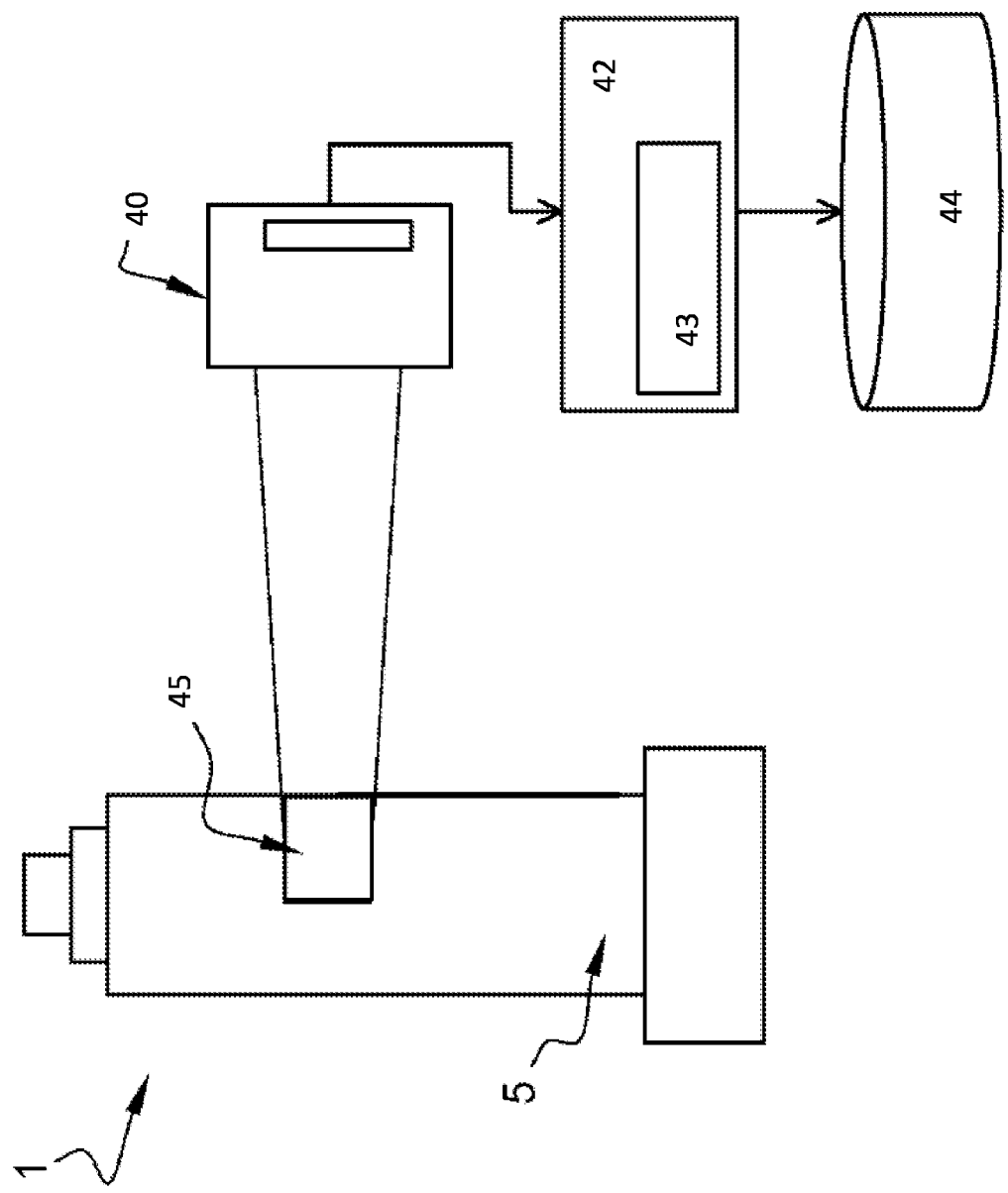
FIG. 1 illustrates an example of a 3D surface geometry measurement of a of a cable.

FIG. 1 is a schematic illustration of a system according for scanning the surface 5 and/or interfaces of high voltage and/or medium voltage cable components, in this example a cable end 1. The sizes of various object of the illustration are not in scale. The system comprises a non-contact surface scanner 40. The non-contact surface scanner 40 is directable to an area of interest 45.

In one embodiment, the non-contact surface scanner 40 may be a 3D laser scanner. The scanner may also be other types of non-contact surface scanners, for example white line scanners using projected white lines able to project up to 1,500,000 measurements/s and/or 99 white light scanning lines, or other kinds of suitable scanners.

Other examples of scanners that can be used are structured light scanner, a lidar based scanner, photogrammetry means that captures a number of images which can be merged into a 3D model, etc.

The non-contact surface scanner 40 is arranged to measure the distance to the surface 5 of the area of interest. In the example in the figure, the field-of-view of the non-contact surface scanner corresponds to the area of interest, but the area of interest 45 on the surface 5 may be larger or smaller than the field-of-view or scanning area of the non-contact surface scanner 40. The field-of-view may be round, rectangular, linear or any other shape as determined by the non-contact surface scanner. The non-contact surface scanner 40 is movable around the cable 1 such that the surface 5 of the cable 1 is covered by a plurality of sub-areas in order to ensure that the entire area of interest is scanned.

The size of plurality of sub-areas may vary, for example by varying the distance between the non-contact surface scanner 40 and the cable 1. In one embodiment the non-contact surface scanner 40 is freely movable in any direction around the cable 1, such as a handheld 3D laser scanner.

The non-contact surface scanner 40 should know its position and direction in 3D space, for example by recognizing a plurality of markers (not shown) positioned on the surface 5. The markers may be stickers or sterile clamps with specific patterns or markers thereon. The markers will result in "NaN" (not a number=empty) areas underneath them, however, the scan can be paused, markers/clamps relocated and then the measurement can also scan the area under the markers. In another embodiment the non-contact surface scanner 40 may be mounted to a fixture or jig, e.g. mountable to the HV-cable, such that the non-contact surface scanner 40 may be moved up/down and around the surface 5 to completely fill the area of interest 45 with sub-areas. In this way, using markers may be avoided. In other embodiments, the non-contact surface scanner 40 can be arranged in a fixture or jig, and the cable may be moved relative to the scanner 40.

In some embodiments, the geometry of the scanned surface itself may be used as reference for the position of the non-contact surface scanner 40 itself in 3D space.

The illustrated system also comprises an analysis unit 42. The analysis unit 42 is in communication with the non-contact surface scanner 40 over a wired or wireless communication link. In one embodiment, at least parts of the analysis unit 42 may be comprised in the non-contact surface scanner 40. The analysis unit 42 comprises a processor 43 adapted to process measurement data from the non-contact surface scanner 40 for each of the plurality of sub-areas to create a continuous 3D surface geometry measurement of the area of interest 45, and thus the surface to be evaluated. The continuous 3D surface geometry measurement can be processed to evaluate the characteristics of the surface and can also create an image of the surface for evaluation and for later reference.

In one embodiment, the analysis unit 42 is adapted to transmit the continuous 3D surface geometry measurement to a storage device 44 as a 3D topographic map of the area of interest 45. The analysis unit 42 is in communication with the storage device 44 over a wired or wireless communication link. The storage device 44 may be on on-premise server or cloud server. The 3D topographic map of the surface 5 of the cable 1 on the server 44 may be accessible to users and clients for future reference of the cable system.

Figure 2:
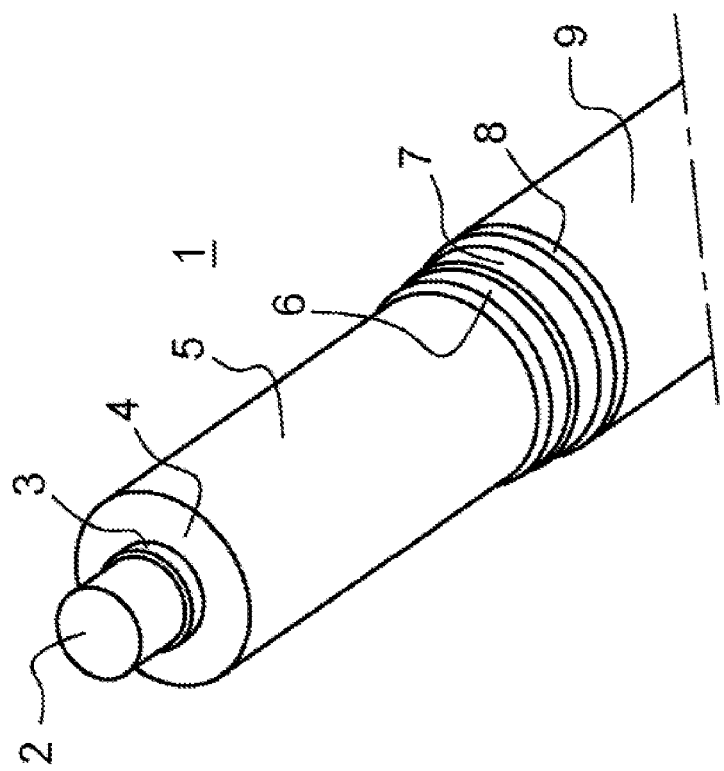
FIG. 2 illustrates a high volt cable end.
Figure 2:
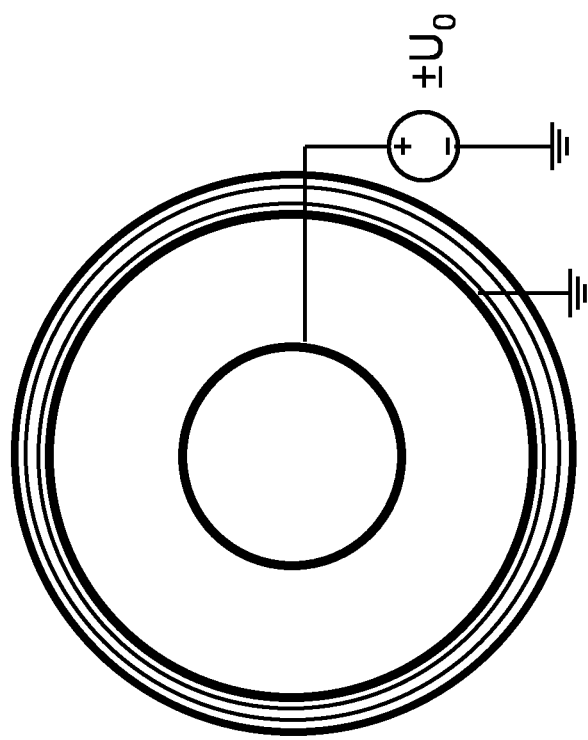

FIG. 2 illustrates a detailed view of a high voltage cable end. As shown an exemplary high voltage cable end 1. The outer sheath 9, the lead sheath 8, swelling tapes 7 and the outer semiconducting screen 6 have been removed, leaving the conductor 2, the inner semiconducting screen 3 and the insulation 4. The surface 5 of the insulation 4 is inspected to ensure that there are no irregularities, before a high voltage cable accessory component, such as high voltage joint, termination for the cable, a rubber joint, is slipped over it.

Figure 3:
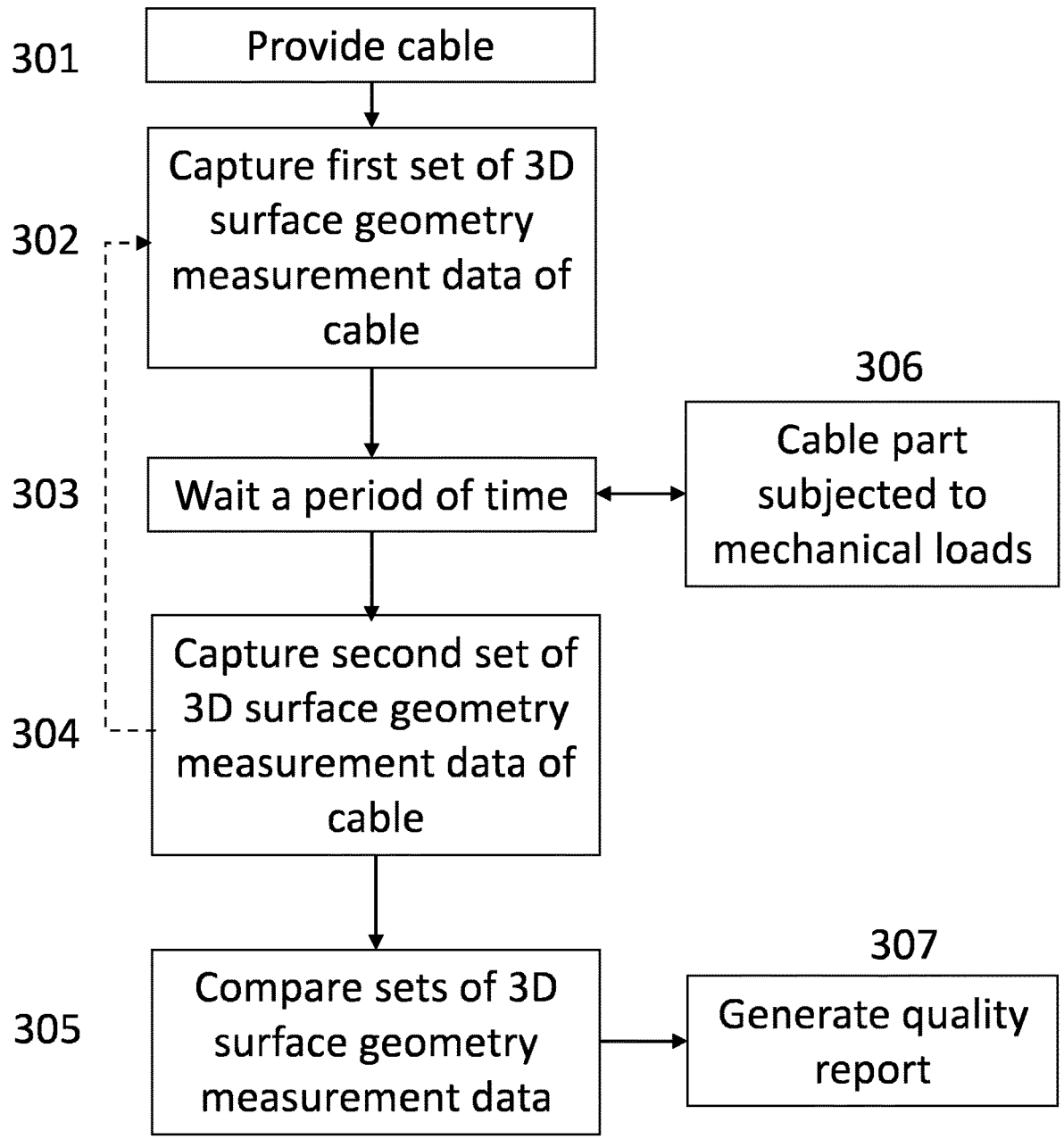
FIG. 3 is a flow chart illustrating steps of a method for detecting deformations of high voltage and/or medium voltage cables and/or cable components.

FIG. 3 illustrates an embodiment of a method for detecting deformations of high voltage and/or medium voltage cables, and/or cable components.

The method is in this example used to detect deformations in a cable, but as described above, it may be used for different types of cables, cable parts, cable accessory, part assemblies, etc.

In the first step 301, a cable is provided which have an area of interest that is expected or suspected to be subjected to mechanical loads or stress, for example cable armor, weldings, accessory parts, flanges, etc.

Then, in 302, at a first point of time, a first set of 3-dimensional, (3D), surface geometry measurement data of an area of interest of a surface of the cable or cable component is captured and the data is stored in a memory for later processing. The 3D surface geometry measurement data can be obtained by moving a 3D surface scanner about the cable over the area of interest as described above.

Alternatively or additionally, the 3D surface geometry measurement data can be obtained by inspecting a data file representing the geometry of the cable or cable component in the area of interest. Such a data file can for example be a 3D drawing and/or specifications of the cable or cable component provided by the manufacturer, a CAD file provided for manufacturing the cable, etc.

The 3D surface geometry measurement data can be represented by a data point cloud, where the data points in the data point cloud can be further processed to provide a representation of the cable, for example a topographic map of the area of interest, the cable or the cable component.

The cable/cable component will then be put to use, for example submarine cables being deployed from a vessel, used for land applications etc., as earlier described, where it is exposed to one or more mechanical loads, see 306 in FIG. 3. After a period of time 303, at a second point of time, in step 304, a second set of 3D surface geometry measurement data of the same area of interest of a surface of the cable or cable component is captured by moving a 3D surface scanner about the cable over the area of interest. The second set of 3D surface geometry measurement data is also stored in a memory. The period of time between the first and second point of time can vary according to the kind of area of interest on the cable, the application of the cable, environmental factors at the location of the cable etc. In some instances, it is important to discover at an early time when a change has occurred, and in these instances a shorter period of time is preferred.

After capturing the second set of measurement data, the first and second sets of captured 3D surface geometry measurement data are compared at step 305 to determine changes that have occurred in the cables or cable components between the first and second points of time. This comparison may be performed by an operator visually inspecting the captured data, or this may be performed by a computer processor. The captured data may in any embodiment be processed to evaluate the characteristics of the surface and can also be processed to create an image of the surface for evaluation and for later reference.

The process may be repeated so that at a third and n subsequent points of time, a third to a $n_{th}$ set of 3-dimensional, (3D), surface geometry measurement data of the area of interest of a surface of the cable or cable component is captured and stored by moving a 3D surface scanner about the cable over the area of interest.

The third to the $n_{th}$ set of captured 3D surface geometry measurement data is then compared to the first and/or to all the previous sets of data to determine changes that have occurred in the cables or cable components between the first, second and $n_{th}$ point of time.

In one embodiment, the analysis unit can provide a go/no go evaluation of the scanned cable/cable part at the second or later point of time. In this way an operator may receive a go or a no go after the scan is performed, allowing or disallowing the operator to proceed with the cable part or marking the cable for repair or replacement.

The criterium for providing go/no go may be based on a selection of criterions. The criterions can be selected depending on the type of cable part to be scanned, the type of non-contact scanner used and the purpose of the scan. Examples of criterions are: a height variation threshold, a surface derivative threshold, a peeling wave threshold and/or at least one of an area of a cut, a depth of a cut, and a slope of a cut.

Further criterions may be employed after further processing of the 3D surface geometry measurement data. Further processing can for example be levelling and sorting the data. Examples of further criterions are local derivatives, local indentation and noise level.

The analysis unit can use the above to identify the worst regions of the area of interest, such as deeper cuts, nicks, scratches, steps, for example by means of finite element method (FEM). The method can calculate local computed FEF and local computed partial discharge inception voltage (PDIV).

The result of the comparisons and analysis can be used in a step 307 to generate a quality report or a monitoring report.

The invention claimed is:

1. A method for detecting deformations of high voltage and/or medium voltage cables and/or cable components, comprising following steps:
   a) at a first point of time, capture and store a first set of 3-dimensional, 3D, surface geometry measurement data of an area of interest of a surface of the cable or cable component,
   b) at a second point of time, capture and store a second set of 3-dimensional, 3D, surface geometry measurement data of said area of interest of said surface of the cable or cable component by moving a 3D surface scanner about the cable over the area of interest, and
   c) compare the first and second sets of captured 3D surface geometry measurement data to determine changes that have occurred in the cable or cable component between the first and second points of time, where changes indicate a deformation of the cable or cable component.

2. The method according to claim 1, wherein the first set of 3D surface geometry measurement data is captured by moving a 3D surface scanner about the cable over the area of interest.

3. The method according to claim 1, wherein the first set of 3D surface geometry measurement data is captured by inspecting a data file representing the geometry of the cable or cable component in the area of interest.

4. The method according to claim 1, wherein the 3D surface geometry measurement data are represented by a data point cloud, where data points in the data point cloud can be further processed to provide a representation of the cable or cable component.

5. The method according to claim 1, further comprising following steps:
   at a $n^{th}$ point of time, capture and store a $n^{th}$ set of 3-dimensional, 3D, surface geometry measurement data of said area of interest of said surface of the cable or cable component by moving a 3D surface scanner about the cable over the area of interest, and
   comparing the n sets of captured 3D surface geometry measurement data to determine changes that have occurred in the cable or cable component between the first, second and $n^{th}$ points of time.

6. The method according to claim 1, further comprising generating a quality report for the area of interest.

7. The method according to claim 5, further comprising generating a quality report for the area of interest, where the quality report comprises a representation of changes over time from the first to the $n^{th}$ point of time.

8. The method according to claim 5, further comprising generating a quality report for the area of interest, where the quality report comprises a representation of changes over time from the first to the $n^{th}$ point of time and/or a go/no go notification allowing or disallowing the cable or cable component to proceed operation at the second or $n^{th}$ point of time.

* * * * *